(12) United States Patent
Swanson et al.

(10) Patent No.: US 10,289,445 B1
(45) Date of Patent: May 14, 2019

(54) AUTOMATIC DEACTIVATION OF SOFTWARE APPLICATION FEATURES IN A WEB-BASED APPLICATION ENVIRONMENT

(71) Applicant: FMR LLC, Boston, MA (US)

(72) Inventors: Jack Swanson, Weare, NH (US); Kevin Handy, Bow, NH (US); Arpit Kothari, Nashua, NH (US); Michael Gaines, Auburn, NH (US); Nayan Patel, Needham, MA (US)

(73) Assignee: FMR LLC, Boston, MA (US)

(*) Notice: Subject to any disclaimer, the term of this patent is extended or adjusted under 35 U.S.C. 154(b) by 0 days.

(21) Appl. No.: 16/216,801

(22) Filed: Dec. 11, 2018

(51) Int. Cl.
| *G06F 9/46* | (2006.01) |
| *G06F 11/34* | (2006.01) |
| *G06F 9/50* | (2006.01) |
| *G06F 9/48* | (2006.01) |
| *G06F 11/30* | (2006.01) |

(52) U.S. Cl.
CPC .............. *G06F 9/466* (2013.01); *G06F 9/485* (2013.01); *G06F 9/5005* (2013.01); *G06F 11/302* (2013.01); *G06F 11/3438* (2013.01); *G06F 11/3442* (2013.01)

(58) Field of Classification Search
CPC ...................................................... G06F 9/466
See application file for complete search history.

(56) References Cited

U.S. PATENT DOCUMENTS

| 7,409,710 | B1 | 8/2008 | Uchil et al. |
| 8,843,827 | B2 | 9/2014 | Koo et al. |
| 9,612,848 | B2 * | 4/2017 | Rosado ................. G06Q 10/10 |
| 2008/0092060 | A1 | 4/2008 | Berg et al. |
| 2014/0115466 | A1 | 4/2014 | Barak et al. |
| 2018/0121045 | A1 | 5/2018 | Mizrahi et al. |
| 2018/0349261 | A1 * | 12/2018 | Desai ................... G06F 12/023 |

* cited by examiner

*Primary Examiner* — Charlie Sun
(74) *Attorney, Agent, or Firm* — Proskauer Rose LLP

(57) ABSTRACT

Methods and systems are described for automatically deactivating application features in a web-based application environment. A server establishes a communication session with remote devices in which a web-based application provided by the server is accessed, the web-based application including an activated application feature that is available to users of the application. The server captures (i) computer resource usage data associated with execution of the activated feature by the remote devices, (ii) computer transaction volume data associated with execution of the activated feature by the remote devices, and (iii) user feedback data associated with use of the activated feature by the users. The server analyzes the computer resource usage data, the computer transaction volume data, and the user feedback data to determine whether to deactivate the activated application feature. The server deactivates the activated application feature for the users based upon the analysis of the computer resource usage data, the computer transaction volume data, and the user feedback data.

30 Claims, 10 Drawing Sheets

$$\underset{Sentiment}{S} + \underset{App\ Health}{A} + \underset{Volume}{V} \Rightarrow Buoyancy$$

$\left\{ \begin{array}{l} Like/Dislike \\ Verbatim \end{array} \right.$   $\left\{ \begin{array}{l} |Errors| < x\% \\ |CPU\%| < y\% \\ |Memory\%| < z\% \end{array} \right.$   $\{\ (Transactions\ Per\ Second\ (TPS)$ $$Decision = f(S, A, V)$$
$$\left\{ \begin{array}{l} S = classify(sentiment) \\ A = classify(x_{classify},\ y_{classify},\ z_{classify}) \\ V = classify(TPS) \end{array} \right.$$

FIG. 3

Volume Logic $T_{actual}$ = Actual TPS in production
$T_{max}$ = Max TPS
$T_{min}$ = Min TPS $$V = classify\,(TPS)$$

$$Decision = (T_{min} \leq T_{actual} \leq T_{max})$$

FIG. 7A

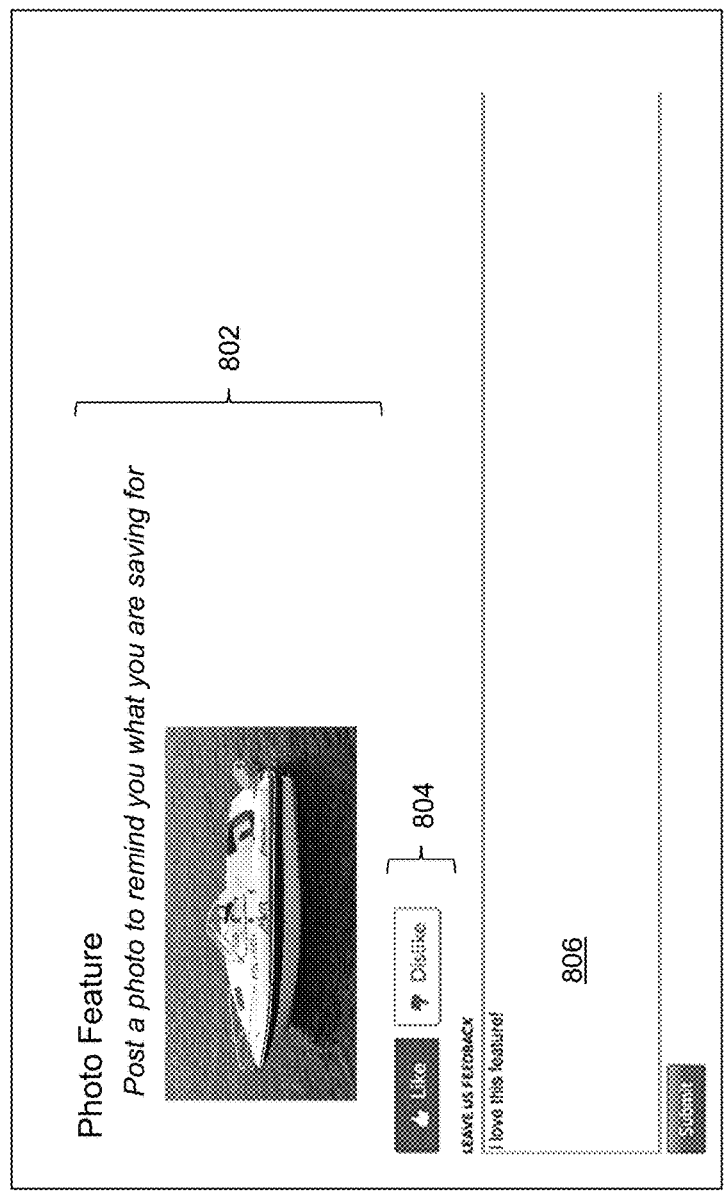

US 10,289,445 B1

AUTOMATIC DEACTIVATION OF SOFTWARE APPLICATION FEATURES IN A WEB-BASED APPLICATION ENVIRONMENT

TECHNICAL FIELD

This application relates generally to methods and apparatuses, including computer program products, for automatic deactivation of software application features in a web-based software application computing environment.

BACKGROUND

There is an emerging need in computerized systems to provide for customized user interface experiences for web-based software applications, such that specific application features and functions (e.g., displays, buttons, menu items, etc.) can be tailored to a specific user and/or a specific application workflow. However, it can be very difficult to determine in advance of release of a specific application feature whether the feature will result in any undesirable or harmful impacts on technical resources of the computing environment. When a web-based software application feature is released into a production computing environment for use by a large number of users, unforeseen challenges can arise with respect to, e.g., resource usage and transaction volume that is associated with execution or use of the application feature. For example, continued or repeated use of an application feature can place unnecessary or dangerous strain on CPU resources required to execute the feature—which could cause application delays or crashes. In another example, the aggregate use of an application feature that stores or retrieves data from a database, across hundreds or thousands of users accessing the application, can overwhelm the computing environment with a high transaction volume—which may result in slower-than-expected performance or even loss of data. In addition, it is possible that an application feature may not be well-received by a certain population of application users—such that continued availability of the application feature can result in lower usage of the application and increased dissatisfaction with the overall application.

SUMMARY

Therefore, what is needed are methods and systems that automatically deactivate certain web-based software application features based upon an analysis of one or more performance-based and feedback-based metrics associated with use of the application features by users of the software application. The techniques described herein advantageously provide a dynamic framework that enables deactivation of application features, for one user, a plurality of users, or an entire user base, by evaluating technical attributes of the application's computing environment that are affected by execution of the specific application feature. In addition, the methods and systems beneficially reduce the potential data and performance risks to the applications by both (i) enabling faster response times in ramping up and ramping down features that may be technically deficient or problematic and (ii) decreasing reaction time in throttling an application feature rollout if the front-end or back-end systems are at risk.

The invention, in one aspect, features a system for automatically deactivating software application features in a web-based software application environment. The system comprises a server computing device that has a memory for storing computer-executable instructions and a processor that executes the computer-executable instructions to establish, with one or more remote computing devices, a communication session in which a web-based software application provided by the server computing device is accessed, the web-based software application including an activated software application feature that is available to a plurality of users of the software application. The server computing device captures computer resource usage data associated with execution of the activated software application feature by one or more of the remote computing devices. The server computing device captures computer transaction volume data associated with execution of the activated software application feature by one or more of the remote computing devices. The server computing device captures user feedback data associated with use of the activated software application feature by one or more of the plurality of users. The server computing device analyzes the computer resource usage data, the computer transaction volume data, and the user feedback data to determine whether to deactivate the activated application software feature in the web-based software application. The server computing device deactivates the activated software application feature in the web-based software application for each of the plurality of users of the software application based upon the analysis of the computer resource usage data, the computer transaction volume data, and the user feedback data.

The invention, in another aspect, features a computerized method of automatically deactivating software application features in a web-based software application environment. A server computing device establishes a communication session with one or more remote computing devices, in which a web-based software application provided by the server computing device is accessed. The web-based software application includes an activated software application feature that is available to a plurality of users of the software application. The server computing device captures computer resource usage data associated with execution of the activated software application feature by one or more of the remote computing devices. The server computing device captures computer transaction volume data associated with execution of the activated software application feature by one or more of the remote computing devices. The server computing device captures user feedback data associated with use of the activated software application feature by one or more of the plurality of users. The server computing device analyzes the computer resource usage data, the computer transaction volume data, and the user feedback data to determine whether to deactivate the activated application software feature in the web-based software application. The server computing device deactivates the activated software application feature in the web-based software application for each of the plurality of users of the software application based upon the analysis of the computer resource usage data, the computer transaction volume data, and the user feedback data.

Any of the above aspects can include one or more of the following features. In some embodiments, the computer resource usage data comprises one or more of: a number of errors generated during execution of the activated software application feature, a measurement of computer processor performance during execution of the activated software application feature, or a measurement of computer memory usage during execution of the activated software application feature. In some embodiments, the server computing device deactivates the activated software application feature when the number of errors generated during execution of the activated software application feature exceeds a predetermined threshold. In some embodiments, the server computing device deactivates the activated software application feature when the measurement of computer processor performance during execution of the activated software application feature is outside a predetermined range of performance. In some embodiments, the server computing device deactivates the activated software application feature when the measurement of computer memory usage during execution of the activated software application feature is outside a predetermined range of usage.

In some embodiments, the computer transaction volume data comprises a number of transactions per second generated during execution of the activated software application feature. In some embodiments, the server computing device deactivates the activated software application feature when the number of transactions per second generated during execution of the activated software application feature exceeds a predetermined threshold. In some embodiments, the user feedback data comprises one or more of: a positive indicator associated with the activated software application feature, a negative indicator associated with the activated software application feature, or unstructured text data associated with the activated software application feature. In some embodiments, the unstructured text data comprises one or more words that are associated with a positive sentiment based upon usage of the activated software application feature or one or more words that are associated with a negative sentiment based upon usage of the activated software application feature. In some embodiments, the server computing device deactivates the activated software application feature when the user feedback data is negative.

In some embodiments, deactivating the activated software application feature in the web-based software application comprises making the activated software application feature unavailable to users of the web-based software application. In some embodiments, making the activated software application feature unavailable to users of the web-based software application comprises removing one or more user interface elements associated with the activated software application feature from a graphical user interface of the web-based software application. In some embodiments, making the activated software application feature unavailable to users of the web-based software application comprises making one or more user interface elements associated with the activated software application feature unable to receive a user interaction event in a graphical user interface of the web-based software application. In some embodiments, deactivating the activated software application feature in the web-based software application comprises removing the activated software application feature from the web-based software application. In some embodiments, after being deactivated, the software application feature is updated and re-activated in the web-based software application.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 3 is a diagram of an exemplary algorithm used by the application feature activation module to determine the buoyancy of a particular application feature.

FIG. 7A is an exemplary classifier algorithm executed by the application feature activation module to analyze the computer transaction volume data generated by the application feature.

FIG. 8 is a diagram of an exemplary like/dislike button and a text feedback field used by the web-based software application.

DETAILED DESCRIPTION

Figure 1:
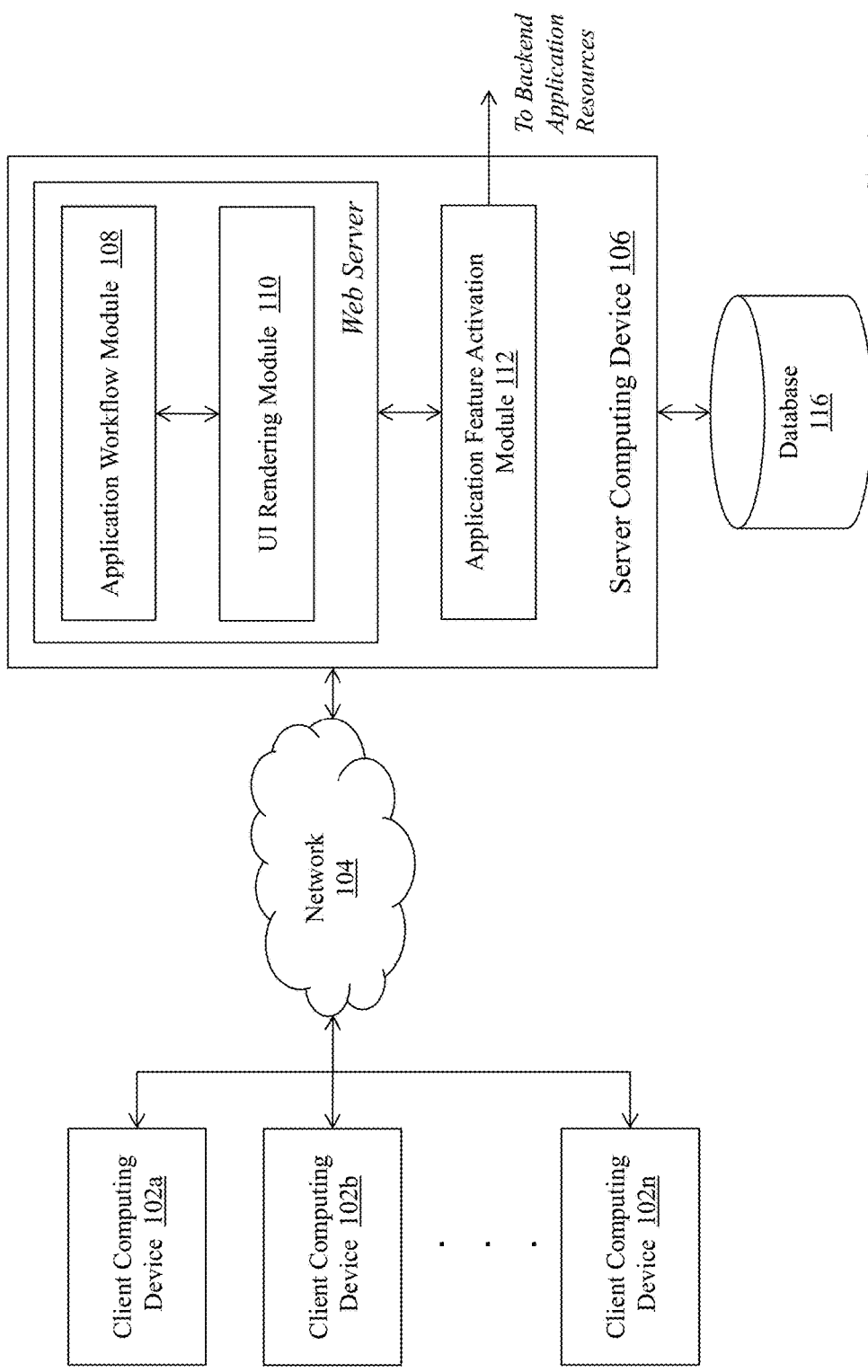
FIG. 1 is a block diagram of a system for automatically deactivating software application features in a web-based software application environment.

FIG. 1 is a block diagram of a system 100 for automatically deactivating software application features in a web-based software application environment. The system 100 includes a plurality of client computing devices 102a-102n (collectively, 102), a communications network 104, a server computing device 106 comprising an application workflow module 108, a user interface (UI) rendering module 110, and an application feature activation module 112, and a database 116.

The client computing devices 102a-102n communicate with server computing device 106 for the purpose of, e.g., interacting with one or more web-based software applications as will be described herein. Exemplary client computing devices 102a-102n include but are not limited to desktop computers, laptop computers, tablets, mobile devices, smartphones, and internet appliances. It should be appreciated that other types of computing devices that are capable of connecting to the components of the system 100 can be used without departing from the scope of invention. It should be appreciated that the system 100 can include any number of client computing devices. And as mentioned above, in some embodiments the client computing devices 102a-102n also include a display for receiving data from the server computing device 106 and/or the database 116 and displaying data to a user of the respective client computing device 102a-102n.

The client computing devices 102a-102n can execute software applications, such as browser applications. In some embodiments, a browser application comprises software executing on a processor of the client computing devices 102a-102n that enables the device to communicate via HTTP or HTTPS with remote servers addressable with URLs (e.g., server computing device 106) to receive software application-related content and services, including one or more webpages, for rendering in the browser application and presentation on a display device embedded in or coupled to the client computing devices 102a-102n. Exemplary browser application software includes, but is not limited to, Firefox™, Chrome™, Safari™, and other similar software. The one or more webpages can comprise visual and audio content for display to and interaction with a user, including but not limited to web-based software applications that comprise one or more application features (e.g., UI features, application workflow functions, transaction-related commands, and the like).

The system 100 also includes a server computing device 106 (e.g., a computing device or devices) that hosts a website, service, or other remote application, to which the client computing devices 102a-102n can connect to retrieve and display software application content, and enable interaction with the software application content from a user of the client computing devices 102a-102n. The server computing device 106 is a combination of hardware, including one or more special-purpose processors and one or more physical memory modules, and specialized software modules including modules 108, 110, 112 that are executed by a processor of the server computing device 106. Typically, a web-based software application comprises a plurality of visual and non-visual elements that make up content transmitted and displayed to a user when, e.g., browser software or native application software on the client computing devices 102a-102n connects to the server computing device 106 via communications network 104 (e.g., Internet) and requests content from the web-based software application. Typical web-based software applications can include, but are not limited to, websites, application services, Software-as-a-Service (SaaS) applications, and so forth. The elements of a web-based software application can include, but are not limited to, webpages (e.g., HTML documents); user interface (UI) elements such as buttons, menus, text fields, drop-down fields, and hyperlinks; image files; layouts; color sets; stylesheets; document object models (DOM); tracking elements; metadata; URLs; media content (e.g., text, audio, video); and data transaction functions (e.g., request data, submit data, update data, delete data).

The communication network 104 enables the other components of the system 100 to communicate with each other in order to perform the process of automatically deactivating software application features in a web-based software application environment as described herein. The network 104 may be a local network, such as a LAN, or a wide area network, such as the Internet and/or a cellular network. In some embodiments, the network 104 is comprised of several discrete networks and/or sub-networks (e.g., cellular to Internet) that enable the components of the system 100 to communicate with each other.

The server computing device 106 is a computing device (or in some embodiments, a set of computing devices) that comprises a combination of hardware, including one or more processors and one or more physical memory modules, and specialized software engines and models that execute on the processor of the server computing device 106, to receive data from other components of the system 100, transmit data to other components of the system 100, and perform functions for automatically deactivating software application features in a web-based software application environment as described herein. As mentioned above, the processor of the server computing device 106 executes an application workflow module 108, a user interface (UI) rendering module 110, and an application feature activation module 112.

In some embodiments, the modules 108, 110, and 112 are specialized sets of computer software instructions programmed onto a dedicated processor in the server computing device 106 and can include specifically-designated memory locations and/or registers for executing the specialized computer software instructions. Although the modules 108, 110, and 112 are shown in FIG. 1 as executing within the same server computing device 106, in some embodiments the functionality of the modules 108, 110, and 112 can be distributed among a plurality of server computing devices. As shown in FIG. 1, the server computing device 106 enables the modules 108, 110, and 112 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of the modules 108, 110, and 112 is described in detail below.

The application workflow module 108 and UI rendering module 110 operate in conjunction with each other to receive requests from the client computing device 102 and generate user interface screens and/or electronic documents, or execute application-specific features, in response to the requests. In some embodiments, the application workflow module 108 and the UI rendering module 110 are part of an application web server that is hosted by the server computing device 106 and that executes one or more software applications for use by the client computing devices 102a-102n. In some embodiments, the software applications executed by the application web server can be operated by a user at one of the client computing devices 102a-102n using browser software located on the client computing device. As mentioned above, exemplary browser software includes, but is not limited to, Mozilla Firefox™ available from Mozilla Corp., Google Chrome™ available from Google Inc., Safari available from Apple Inc., and Microsoft Edge™ available from Microsoft Corp. For example, the client computing devices 102a-102n can launch browser software and connect to the web server using a particular Uniform Resource Identifier (URI), such as a web address or URL, to access one or more software applications (e.g., cloud-based applications, Software-as-a-Service (SaaS), and the like) provided by the server computing device 106. Also, it should be appreciated that many different client computing devices 102a-102n, each operated by a different user, can establish a connection to the server computing device 106 to access web-based application functions provided by the server computing device 106. The application workflow module 108 and the UI rendering module 110 can generate customized web-based applications, including configuration of a specific set of activated and deactivated application features, for each user and/or for specific groups or segments of users.

In some embodiments, the application workflow module 108 establishes a connection with the client computing devices 102a-102n and manages the state of one or more web-based software applications being used by the client computing device 102, including issuing requests to, and receiving data from, other computing devices and/or computing systems as part of an overall application workflow.

For example, as a user at client computing device 102a accesses and navigates through a software application being provided by the server computing device 106, the client computing device 102a establishes a communication session with the application workflow module 108, which analyzes incoming requests from the client computing device 102a and takes corresponding action in response to the requests (e.g., retrieve information from database 116, instruct UI rendering module 110 to generate one or more user interface screens, execute data transactions with one or more backend resources (such as other servers, databases, or computing resources), generate one or more electronic documents for transmission to the client computing device 102, manage one or more workflows associated with the software application being accessed by the client computing device 102, and the like.

As explained above, the UI rendering module 110 generates one or more user interface screens for presentation on the client computing devices 102a-102n as part of a software application being provided by the server computing device 106. In some embodiments, the application workflow module 108 instructs the UI rendering module 110 to generate particular screens based upon a current state of an application workflow—e.g., when a user at client computing device 102a accesses a particular software function, the UI rendering module 110 generates and arranges the UI elements based upon the accessed software function.

The database 116 is a computing device (or in some embodiments, a set of computing devices) that is coupled to the server computing device 106 and is configured to receive, generate, and store specific segments of data relating to the process of automatically deactivating software application features in a web-based software application environment as described herein. In some embodiments, all or a portion of the database 116 can be integrated with the server computing device 106 or be located on a separate computing device or devices. For example, the database 116 can comprise one or more databases, such as MySQL™ available from Oracle Corp. of Redwood City, Calif.

Finally, the server computing device 106 (and the corresponding modules 108, 110, 112) can connect to backend application resources (not shown) in order to provide or supplement certain web-based software application functionality. Exemplary backend application resources can include, but are not limited to, mainframe computers, databases, transaction managers, load balancers, error logging services, and so forth. Further information about the backend application resources is provided below.

Figure 2:
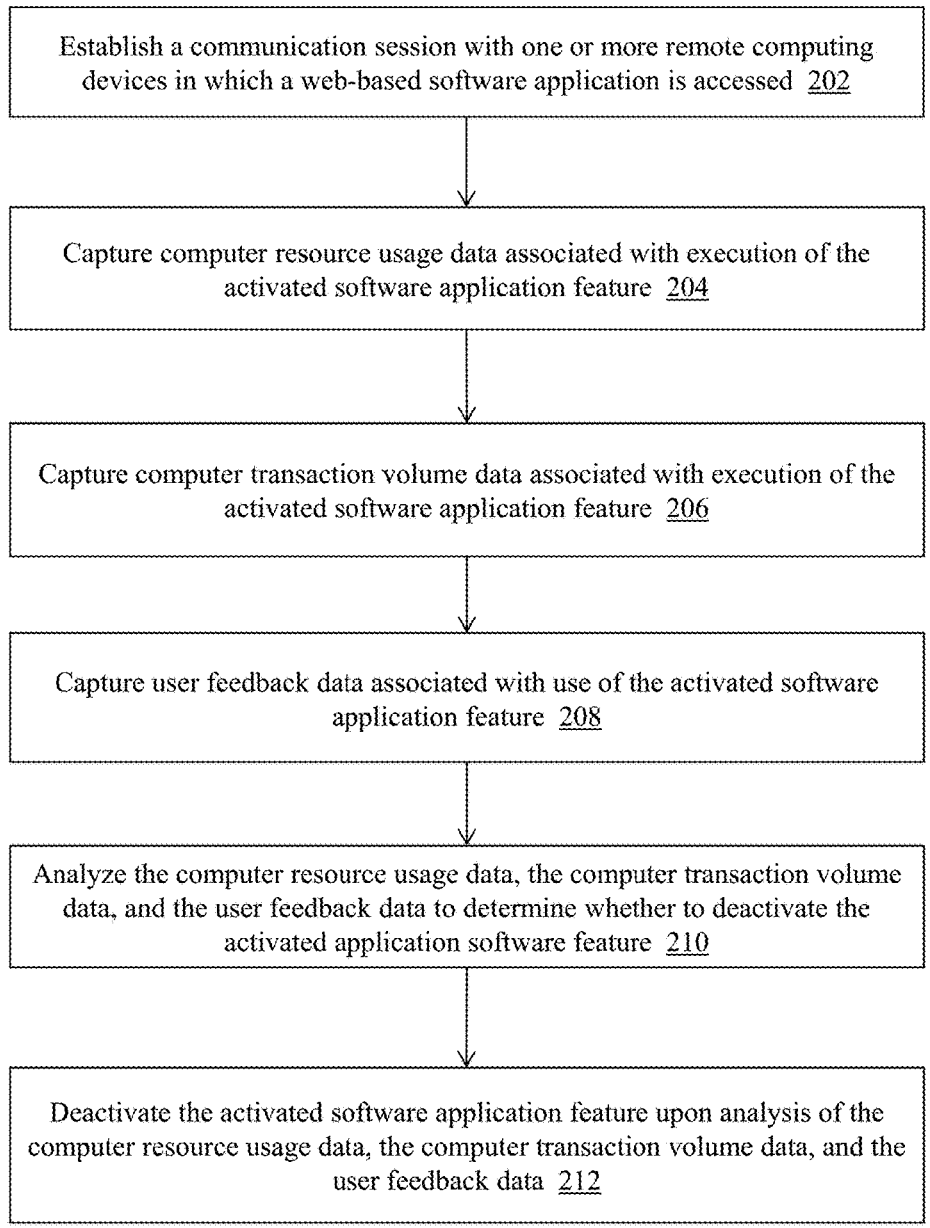
FIG. 2 is a flow diagram of a computerized method of automatically deactivating software application features in a web-based software application environment.

FIG. 2 is a flow diagram of a computerized method 200 of automatically deactivating software application features in a web-based software application environment, using the system 100 of FIG. 1. The application workflow module 108 of server computing device 106 receives a request from one or more of the client computing devices 102a-102n to access web-based software application functionality provided by the server computing device. The application workflow module 108 establishes (202) a communication session with the requesting client computing device(s) 102a-102n to enable access to the web-based software application by the client computing device(s). In some embodiments, the request received from the client computing device 102 includes an identifier associated with the client computing device itself and/or a user of the client computing device (e.g., a username, account number, ID, serial number, authentication credential, MAC address, IP address, operating system, browser version, etc.). The request can also include an identifier associated with an application workflow (e.g., an identifier for a particular software application and/or application function that is being requested by the client computing device). For example, the identifier associated with the application workflow can comprise a URI, URL, or other network address of the application and/or function requested by the client computing device. In another example, the identifier associated with the application workflow can comprise a numeric or alphanumeric identifier that is parsed by the application workflow module 108 to redirect the client computing device to a specific software application or sub-application.

As part of establishing the communication session and providing access to the web-based software application to the client computing device, the application workflow module 108 and UI rendering module 110 operate to determine one or more application features that should be activated for the requesting client computing device (e.g., based upon device identifier, application workflow identifier, user identifier, etc. that is encapsulated in the request). In one example, the application workflow module 108 can retrieve a device profile and/or a user profile, based upon the data in the request, which defines the application features that are active for the requesting device/user. For example, one user's profile may indicate that a particular menu option within the web-based software application is activated (e.g., meaning that it should appear to the user in the application UI and be available for interactions from the user). Another user's profile may indicate that the same menu option within the web-based software application is deactivated (e.g., meaning that it should not appear to this user in the application UI or be available for interactions). It should be appreciated that other types of application feature configuration structures and paradigms can be used within the scope of invention.

The UI rendering module 110 can receive programmatic instructions and commands from the application workflow module 108 to generate UI screens and application features that are part of the web-based software application. The UI rendering module 110 can receive the device profile and/or user profile information from the application workflow module 108 and render one or more UI screens or elements based upon the profile information. For example, if a specific software application feature is activated for a particular user, the UI rendering module 110 can make that feature visible to the user (and/or able to receive interactions from the user) within the application. In some embodiments, the application features activated for a particular client computing device and/or user at the initiation of a communication session can be considered the default set of activated application features.

Once the client computing device 102a has established a communication session with the server computing device 106, and the application workflow module 108 and UI rendering module 110 have enabled access to and displayed UI elements for one or more web-based software applications to the client computing device 102, the user can begin interacting with the software applications. For example, the user can select UI elements, execute application functions, submit requests for data, and so forth in the context of the software application.

In some cases, an application developer may want to provide specific software application features to one or more users as part of a testing process (e.g., to gauge effectiveness or usability of the application features) or to roll out production-level application features gradually to a corpus of application users. In these cases, the system 100 provides the capability to automatically enable certain software application features for specific users and monitor the impact of such application features on the overall computing environment—so that some application features can be automatically deactivated for particular users, or for the entire user base, if those features are negatively impacting the application performance, application usability, or application user experience.

To this end, the application feature activation module 112 can actively monitor application-specific resource usage, transaction volume, and user feedback to determine whether an existing application feature, or a newly-released application feature, should be deactivated. If the module 112 determines that a feature should be deactivated, the module 112 can instruct the application workflow module 108 and/or the UI rendering module 110 to deactivate the feature in the web-based software application. Generally, the determination of whether to deactivate an application feature, or keep a current application feature active, can be considered as the 'buoyancy' of the application feature—in that, application features that should be active rise to the top based upon the metrics analyzed by the system 100, while application feature that should be deactivated are pushed down based upon the metrics.

FIG. 3 is a diagram of an exemplary algorithm executed by the application feature activation module 112 to determine the buoyancy of a particular application feature. As shown in FIG. 3, the Buoyancy comprises Sentiment (S), App Health (A), and Volume (V):

$$\text{Sentiment}(S) + \text{App Health}(A) + \text{Volume}(V) \Rightarrow \text{Buoyancy}$$

Sentiment corresponds to user feedback data relating to the application feature that is captured by the web-based software application. Generally, Sentiment (S) can comprise elements such as indications of like/dislike provided by the user (e.g., via a toggle button in proximity to the application feature) or analysis of verbatim text feedback (e.g., entered by the user in a text field). App Health (A) relates to application-specific and/or feature-specific computer resource usage data (e.g., errors occurring through use of the feature, CPU usage occurring through use of the feature, memory usage occurring through use of the feature). And, Volume (V) relates to an analysis of transactions per second (TPS) resulting from usage of the application and/or the specific application feature. Continuing with FIG. 3, the application feature activation module 112 analyzes each of the Sentiment (S), App Health (A), and Volume (V) using a classifier process for each type of data, and combines the resulting values using a decision function to determine whether the corresponding software application feature should remain active or be deactivated. It should be appreciated that other metrics may be used to determine a feature's buoyancy, and/or other algorithms or methods can be used to determine the Sentiment, App Health, and Volume, within the scope of invention.

To determine buoyancy, the application feature activation module 112 captures (204) computer resource usage data associated with execution of one or more activated software application features. For example, one or more application features can utilize CPU resources, memory resources, or other types of computing resources when those features are accessed or executed within the web-based software application. Also, usage of one or more application features within the software application may cause certain application-specific errors which are logged by the system 100. The application feature activation module 112 can monitor this type of computer resource usage data to determine whether the application feature(s) should be deactivated.

In one embodiment, the application feature activation module 112 includes a classifier that analyzes error data [x], CPU usage [y], and memory usage [z] for the software application features, and determines the App Health value (A) based upon the classification of the computer resource usage data:

$$A = \text{classify}(x_{classify}, y_{classify}, z_{classify})$$

Figure 4:
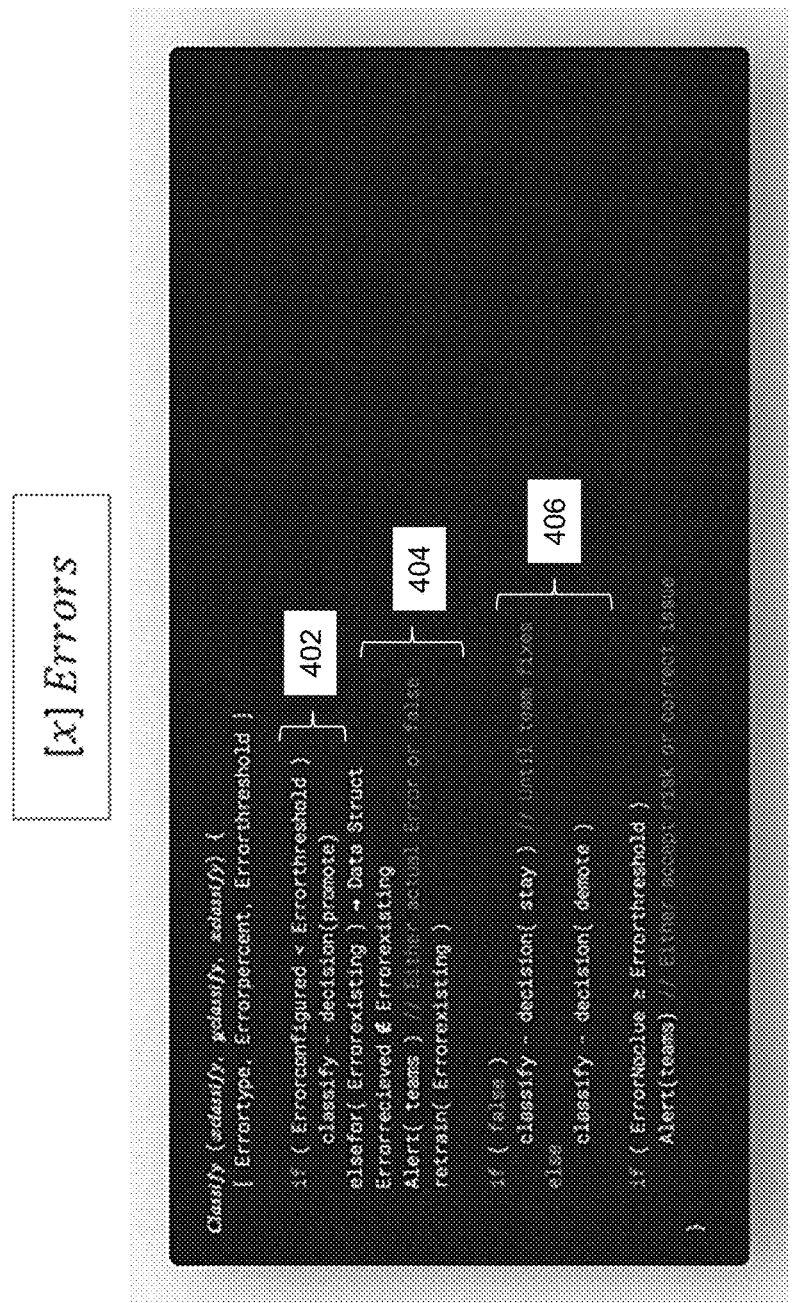
FIG. 4 is a diagram of an exemplary classifier algorithm executed by the application feature activation module to analyze the error data generated by the application feature.

FIG. 4 is a diagram of an exemplary classifier algorithm executed by the application feature activation module 112 to analyze the error data generated by the application feature. As shown in FIG. 4, the overall App Health is determined by classification of error data [x], CPU usage [y], and memory usage [z]. For error data [x], the application feature activation module 112 can capture data associated with errors resulting from usage of the application feature—including error type and error percentage (e.g., how many errors occurred against total number of feature uses) and compare this captured information against a predetermined threshold. For example, a certain level and/or severity of errors may be tolerated or expected with a given application feature, without necessitating deactivation of the feature. If the error data falls below the predetermined threshold, then the classifier can decide to promote the application feature to an active state or keep the feature active (i.e., lines 402 in FIG. 4). Otherwise, the application feature activation module 112 can store the error data in a data structure, determine whether the error is already known, and retrain the classifier using the error data (lines 404 in FIG. 4).

If the application feature activation module 112 determines that the error data, even though above the threshold, should not result in deactivation of the application feature, the module 112 can determine that the application feature should stay active (i.e., lines 406 in FIG. 4). Otherwise, the application feature activation module 112 determines that the application feature should be deactivated (e.g., 'demoted). The module 112 then provides its determination (promote/stay, demote) to the overall buoyancy classifier shown in FIG. 3.

Figure 5:
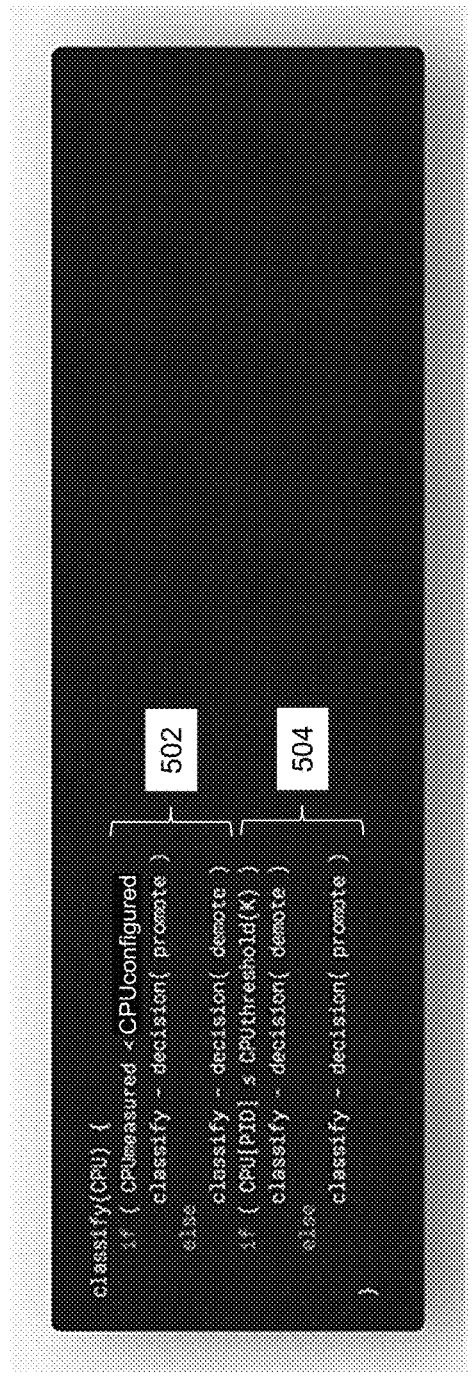
FIG. 5 is a diagram of an exemplary classifier algorithm executed by the application feature activation module to analyze the CPU usage data generated by the application feature.

For CPU usage, in one embodiment the application feature activation module 112 captures CPU usage associated with a process ID of the web-based software application during install and/or activation of the application (i.e., when a client computing device requests the application from the server computing device). FIG. 5 is a diagram of an exemplary classifier algorithm executed by the application feature activation module 112 to analyze the CPU usage data generated by the application feature. As shown in FIG. 5, the classifier analyzes whether the measured CPU usage associated with the application feature is less than a configured CPU usage value; if so, then the classifier determines that the application feature should be active; if not, then the classifier determines that the application feature should be deactivated (i.e., lines 502 of FIG. 5). As a secondary check, the classifier can also analyze the CPU usage associated with a specific process ID of the application during installation (CPU[PID]) and compare that value to a predetermined CPU threshold value—if the CPU usage is at or below the CPU threshold value, then the classifier can determine that the application feature should be deactivated; otherwise, the classifier can determine that the application feature should be active (i.e., lines 504 of FIG. 5). The module 112 then provides its classification determination (promote/stay, demote) with respect to the CPU usage to the overall buoyancy classifier shown in FIG. 3.

Figure 6:
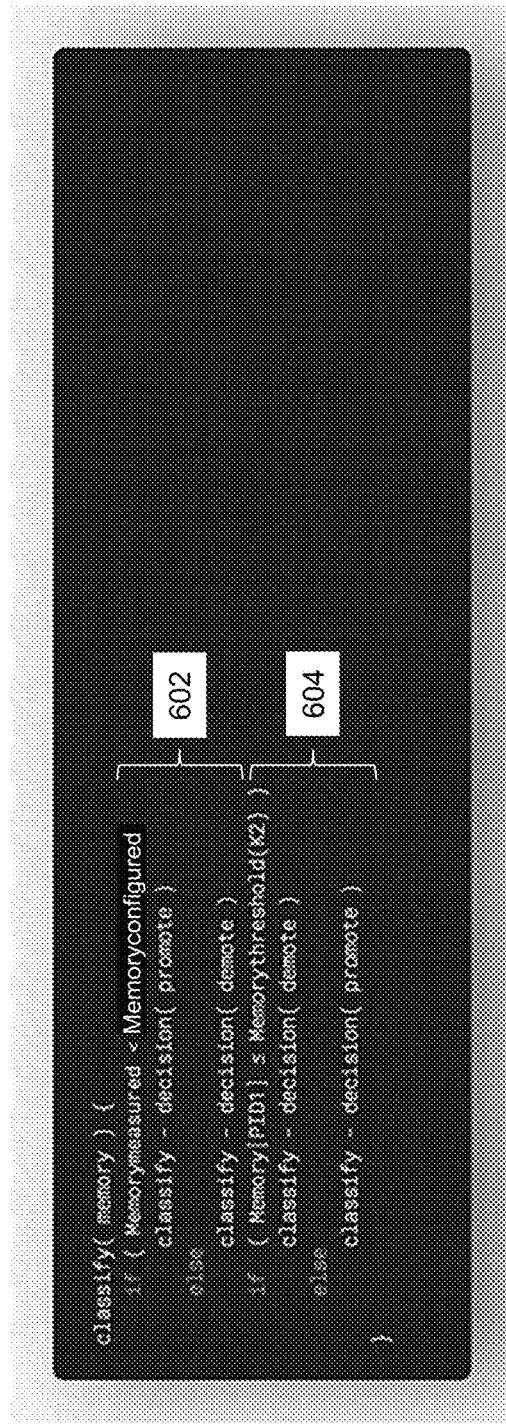
FIG. 6 is a diagram of an exemplary classifier algorithm executed by the application feature activation module to analyze the memory usage data generated by the application feature.

For memory usage, in one embodiment the application feature activation module 112 captures memory usage associated with a process ID of the web-based software application during install and/or activation of the application (i.e., when a client computing device requests the application from the server computing device). FIG. 6 is a diagram of an exemplary classifier algorithm executed by the application feature activation module 112 to analyze the memory usage data generated by the application feature. As shown in FIG. 6, the classifier analyzes whether the measured memory usage associated with the application feature is less than a configured memory usage value; if so, then the classifier determines that the application feature should be active; if not, then the classifier determines that the application feature should be deactivated (i.e., lines 602 of FIG. 6). As a secondary check, the classifier can also analyze the memory usage associated with specific process ID of the application during installation (Memory[PID1]) and compare that value to a predetermined memory threshold value—if the memory usage is at or below the memory threshold value, then the classifier can determine that the application feature should be deactivated; otherwise, the classifier can determine that the application feature should be active (i.e., lines 604 of FIG. 6). The module 112 then provides its classification determination (promote/stay, demote) with respect to the memory usage to the overall buoyancy classifier shown in FIG. 3.

Turning back to FIG. 2, the application feature activation module 112 further captures (206) computer transaction volume data associated with use of the one or more activated software application features. A specific software application feature can initiate or otherwise relate to one or more data processing transactions that are executed by, e.g., the server computing device 106 and/or one or more backend systems (not shown) when the software application feature is used. For example, a search feature (e.g., a text box and search execution button) may be activated for one or more users of the software application, and use of the search feature can cause a plurality of data transactions to be executed by one or more computing devices (e.g., data search and retrieval, data formatting, etc.). If the search feature is not designed properly, and many users access the feature, use of the feature may result in transactions that significantly erode the processing efficiency and responsiveness of the web-based software application. Therefore, the module 112 can analyze such transaction volume data to determine whether specific application features should be active (i.e., they do not negatively impact application performance) or be deactivated (i.e., to improve application performance until the feature can be fixed).

FIG. 7A is an exemplary classifier algorithm executed by the application feature activation module 112 to analyze the computer transaction volume data generated by the application feature. As shown in FIG. 7A, the module 112 captures $T_{actual}$, which is the actual transactions per second (TPS) associated with the application feature in the production computing environment, $T_{max}$, which is a maximum TPS threshold, and $T_{min}$, which is a minimum TPS threshold. In one embodiment, the maximum and minimum thresholds can be determined according to expected and/or optimal application performance. The module 112 determines whether the actual TPS is in between the maximum and minimum TPS thresholds. If so, the module 112 determines that the application feature should be active, and if not, the module 112 determines that the application feature should be deactivated. The module 112 then provides its decision with respect to the transaction volume data to the overall buoyancy classifier shown in FIG. 3.

Figure 7B:
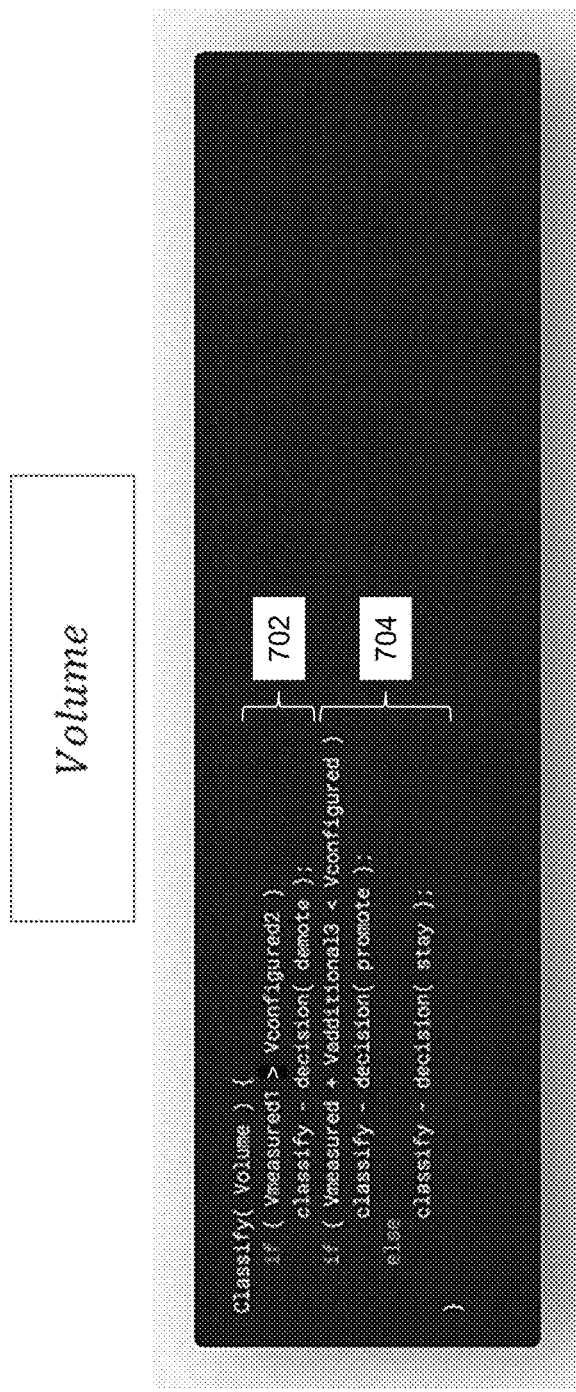
FIG. 7B is another exemplary classifier algorithm executed by the application feature activation module 112 to analyze the computer transaction volume data generated by the application feature.

FIG. 7B is another exemplary classifier algorithm executed by the application feature activation module 112 to analyze the computer transaction volume data generated by the application feature. As shown in FIG. 7B, the module measures actual TPS ($V_{measured}$) generated by the application feature and compares the actual TPS to expected TPS ($V_{configured}$) based on 100% rollout of the application features; if the actual TPS is greater than the expected TPS, then the classifier decides to deactivate the application feature (i.e., lines 702 of FIG. 7B). Otherwise, the module 112 combines the actual TPS plus an estimate of additional TPS based upon users that may be entitled to use the application feature ($V_{additional}$). If the actual TPS plus additional TPS is less than the expected TPS ($V_{configured}$), then the classifier decides to make (or keep) the application feature active (i.e., lines 704 of FIG. 7B).

Turning back to FIG. 2, the application feature activation module 112 further captures (208) user feedback data associated with use of the one or more activated software application features. To capture user feedback, in some embodiments a specific application feature can have a like/dislike button on screen in proximity to the feature, that enables a user to instantly indicate whether the user likes the feature or not. In some embodiments, a specific application feature can have a text feedback field in proximity to the feature, which enables a user to type in specific positive and/or negative comments relating to use of the feature. FIG. 8 is a diagram of an exemplary like/dislike button and a text feedback field used by the web-based software application. As shown in FIG. 8, an exemplary application feature 802 could be enabling a user to upload and post a picture (e.g., of an item such as a boat) that reminds the user what he or she is saving for—so that when the user logs into the software application in the future, he or she can see the picture and be reminded to stay on track with long-term savings goals. Immediately below the application feature is the like/dislike button 804—where the user can click on 'like' if he or she has a positive view of the feature, or click on 'dislike' if not. In addition, the screen includes a text feedback field 806 where the user can type in specific comments (e.g., "I love this feature!") relating to the application feature, and click the Submit button to transmit the comments to the module 112.

Figure 9:
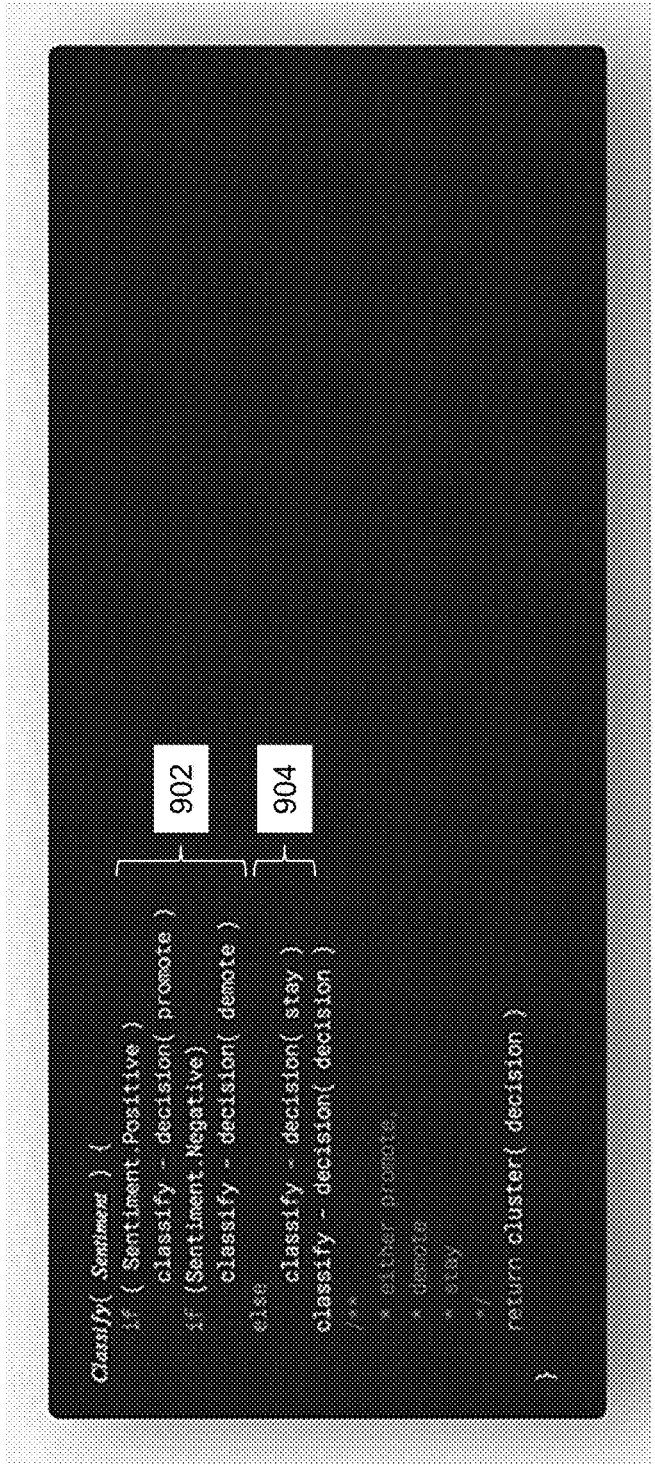
FIG. 9 is an exemplary classification algorithm executed by the application feature activation module to decide whether to deactivate the application feature.

The application feature activation module 112 then determines whether to deactivate the application feature based upon the captured user feedback data. FIG. 9 is an exemplary classification algorithm executed by the application feature activation module 112 to decide whether to deactivate the application feature. As shown in FIG. 9, the classifier can analyze the user feedback data to determine whether the feedback is positive or negative. For example, the classifier can use a sentiment analysis tool—such as a natural language processing (NLP) API like Cloud Natural Language™ available from Google, Inc.—to identify a sentiment associated with text feedback provided by the user. If the sentiment is positive, the module 112 can keep the application feature active; or if the sentiment is negative, the module 112 can deactivate the feature (i.e., lines 902 of FIG. 9). If the sentiment is neither positive nor negative, the module 112 can keep the feature active (i.e., lines 904 of FIG. 9). The module 112 then provides its decision with respect to the user feedback data to the overall buoyancy classifier shown in FIG. 3.

Turning back to FIG. 2, once the computer resource usage data, transaction volume data, and user feedback data is captured by the application feature activation module 112, the module 112 analyzes (210) the captured data (as described above) to determine whether to deactivate the activated application software feature. For example, the module 112 makes a decision using the determinations made by each of the classifier algorithms described previously in an overall function (shown in FIG. 3):

$$Decision = f(S, A, V)$$

In some embodiments, the module 112 can apply one or more weights to some or all of the underlying classification determinations in making its deactivation decision. For example, certain application features may not be associated with a large amount of user feedback or may not result in many (or any) transactions in the system. As a result, the module 112 can weigh those classification facets less than the app health facet. In another example, it may be determined that user feedback on a particular application feature is the strongest indicator of whether the application feature should be active or not—in this case, the module 112 can apply a higher weight to the user feedback determination in making the overall decision.

Once the application feature activation module 112 has made the overall deactivation determination, the module 112 takes action with respect to existing application features if necessary. For example, if the determination is that an activated software application feature should be deactivated, the module 112 deactivates (212) the activated application feature so that users cannot see and/or interact with the application feature upon subsequent use of the web-based software application. The module 112 can deactivate application features in a number of different ways. In one example, the module 112 instructs the UI rendering module 110 to remove the application feature from the UI that is rendered and provided to the client computing devices 102a-102n—e.g., if the application feature is part of the underlying UI code (HTML, XML) that is provided to the client computing device, the UI rendering module 110 can opt to not include that code when rendering the UI. In another example, the module 112 can update a database field (e.g., an activation flag) associated with the specific application feature in database 114 so that when the application workflow module 108 and UI rendering module 110 generate the application UI during a session with a client device, the modules 108, 110 can evaluate the activation flag to determine that the application feature should not be included in the application UI, or that the application feature should be included in the application UI but grayed out or made inactive. It should be appreciated that other types of deactivation processes can be used to modify the web-based software application to remove or disable specific application features within the scope of invention.

In summary, the methods and systems described herein provide the advantage of automatically disabling (or keeping active) specific software application features in the context of a web-based software application, based upon evaluation of specific computing metrics. As a result, the methods and systems achieve improved technical efficiency and performance of web-based software applications—in that application features that create less-than-optimal resource performance, are potentially disruptive to the computing environment, result in undesirable load or slow down, or are simply not liked by users, can be dynamically and automatically removed from further use within the software application.

Method steps can be performed by one or more special-purpose processors executing a computer program to perform functions of the invention by operating on input data and/or generating output data. Method steps can also be performed by, and an apparatus can be implemented as, special-purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special-purpose microprocessors. Generally, a processor receives instructions and data from a read-only memory or a random access memory or both. The essential elements of a computer are a specialized processor for executing instructions and one or more specifically-allocated memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for automatically deactivating software application features in a web-based software application environment, the system comprising:
a server computing device that has a memory for storing computer-executable instructions and a processor that executes the computer-executable instructions to:
establish, with one or more remote computing devices, a communication session in which a web-based software application provided by the server computing device is accessed, the web-based software application including an activated software application feature that is available to a plurality of users of the software application;
capture computer resource usage data associated with execution of the activated software application feature by one or more of the remote computing devices;
capture computer transaction volume data associated with execution of the activated software application feature by one or more of the remote computing devices;
capture user feedback data associated with use of the activated software application feature by one or more of the plurality of users;
analyze the computer resource usage data, the computer transaction volume data, and the user feedback data to determine whether to deactivate the activated application software feature in the web-based software application; and
deactivate the activated software application feature in the web-based software application for each of the plurality of users of the software application based upon the analysis of the computer resource usage data, the computer transaction volume data, and the user feedback data.

2. The system of claim 1, wherein the computer resource usage data comprises one or more of: a number of errors generated during execution of the activated software application feature, a measurement of computer processor performance during execution of the activated software application feature, or a measurement of computer memory usage during execution of the activated software application feature.

3. The system of claim 2, wherein the server computing device deactivates the activated software application feature when the number of errors generated during execution of the activated software application feature exceeds a predetermined threshold.

4. The system of claim 2, wherein server computing device deactivates the activated software application feature when the measurement of computer processor performance during execution of the activated software application feature is outside a predetermined range of performance.

5. The system of claim 2, wherein server computing device deactivates the activated software application feature when the measurement of computer memory usage during execution of the activated software application feature is outside a predetermined range of usage.

6. The system of claim 1, wherein the computer transaction volume data comprises a number of transactions per second generated during execution of the activated software application feature.

7. The system of claim 6, wherein the server computing device deactivates the activated software application feature when the number of transactions per second generated during execution of the activated software application feature exceeds a predetermined threshold.

8. The system of claim 1, wherein the user feedback data comprises one or more of: a positive indicator associated with the activated software application feature, a negative indicator associated with the activated software application feature, or unstructured text data associated with the activated software application feature.

9. The system of claim 8, wherein the unstructured text data comprises one or more words that are associated with a positive sentiment based upon usage of the activated software application feature or one or more words that are associated with a negative sentiment based upon usage of the activated software application feature.

10. The system of claim 8, wherein the server computing device deactivates the activated software application feature when the user feedback data is negative.

11. The system of claim 1, wherein deactivating the activated software application feature in the web-based software application comprises making the activated software application feature unavailable to users of the web-based software application.

12. The system of claim 11, wherein making the activated software application feature unavailable to users of the web-based software application comprises removing one or more user interface elements associated with the activated software application feature from a graphical user interface of the web-based software application.

13. The system of claim 11, wherein making the activated software application feature unavailable to users of the web-based software application comprises making one or more user interface elements associated with the activated software application feature unable to receive a user interaction event in a graphical user interface of the web-based software application.

14. The system of claim 1, wherein deactivating the activated software application feature in the web-based software application comprises removing the activated software application feature from the web-based software application.

15. The system of claim 1, wherein after being deactivated, the software application feature is updated and re-activated in the web-based software application.

16. A computerized method of automatically deactivating software application features in a web-based software application environment, the method comprising:
   establishing, by a server computing device with one or more remote computing devices, a communication session in which a web-based software application provided by the server computing device is accessed, the web-based software application including an activated software application feature that is available to a plurality of users of the software application;
   capturing, by the server computing device, computer resource usage data associated with execution of the activated software application feature by one or more of the remote computing devices;
   capturing, by the server computing device, computer transaction volume data associated with execution of the activated software application feature by one or more of the remote computing devices;
   capturing, by the server computing device, user feedback data associated with use of the activated software application feature by one or more of the plurality of users;
   analyzing, by the server computing device, the computer resource usage data, the computer transaction volume data, and the user feedback data to determine whether to deactivate the activated application software feature in the web-based software application; and
   deactivating, by the server computing device, the activated software application feature in the web-based software application for each of the plurality of users of the software application based upon the analysis of the computer resource usage data, the computer transaction volume data, and the user feedback data.

17. The method of claim 16, wherein the computer resource usage data comprises one or more of: a number of errors generated during execution of the activated software application feature, a measurement of computer processor performance during execution of the activated software application feature, or a measurement of computer memory usage during execution of the activated software application feature.

18. The method of claim 17, wherein the server computing device deactivates the activated software application feature when the number of errors generated during execution of the activated software application feature exceeds a predetermined threshold.

19. The method of claim 17, wherein server computing device deactivates the activated software application feature when the measurement of computer processor performance during execution of the activated software application feature is outside a predetermined range of performance.

20. The method of claim 17, wherein server computing device deactivates the activated software application feature when the measurement of computer memory usage during execution of the activated software application feature is outside a predetermined range of usage.

21. The method of claim 16, wherein the computer transaction volume data comprises a number of transactions per second generated during execution of the activated software application feature.

22. The method of claim 21, wherein the server computing device deactivates the activated software application feature when the number of transactions per second generated during execution of the activated software application feature exceeds a predetermined threshold.

23. The method of claim 16, wherein the user feedback data comprises one or more of: a positive indicator associated with the activated software application feature, a negative indicator associated with the activated software application feature, or unstructured text data associated with the activated software application feature.

24. The method of claim 23, wherein the unstructured text data comprises one or more words that are associated with a positive sentiment based upon usage of the activated software application feature or one or more words that are associated with a negative sentiment based upon usage of the activated software application feature.

25. The method of claim 23, wherein the server computing device deactivates the activated software application feature when the user feedback data is negative.

26. The method of claim 16, wherein deactivating the activated software application feature in the web-based software application comprises making the activated software application feature unavailable to users of the web-based software application.

27. The method of claim 26, wherein making the activated software application feature unavailable to users of the web-based software application comprises removing one or more user interface elements associated with the activated software application feature from a graphical user interface of the web-based software application.

28. The method of claim 26, wherein making the activated software application feature unavailable to users of the web-based software application comprises making one or more user interface elements associated with the activated software application feature unable to receive a user interaction event in a graphical user interface of the web-based software application.

29. The method of claim 16, wherein deactivating the activated software application feature in the web-based software application comprises removing the activated software application feature from the web-based software application.

30. The method of claim 16, wherein after being deactivated, the software application feature is updated and re-activated in the web-based software application.

\* \* \* \* \*